July 22, 1941.  W. R. TALIAFERRO  2,249,870
CONTROL SYSTEM
Filed June 23, 1939   2 Sheets-Sheet 1

WITNESSES:
Edward Michaels
Joe Weber

INVENTOR
William R. Taliaferro.
BY
G. M. Crawford
ATTORNEY

Patented July 22, 1941

2,249,870

UNITED STATES PATENT OFFICE 2,249,870

CONTROL SYSTEM

William R. Taliaferro, Pittsburgh, Pa., assignor to Westinghouse Electric & Manufacturing Company, East Pittsburgh, Pa., a corporation of Pennsylvania Application June 23, 1939, Serial No. 280,713

15 Claims. (Cl. 175—294)

My invention relates, generally, to control systems, and, more particularly, to a calibration control system for an automatic reclosing circuit breaker system.

It is common practice to provide an automatic reclosing circuit breaker system with a measuring relay which will cause the circuit breaker to reclose only when the load resistance exceeds a predetermined value when the breaker is controlling a stub feeder circuit having only a single source of power, or when the line potential exceeds a predetermined amount when the breaker is controlling a multiple feeder circuit having more than one source of power connected thereto. Where a common relay is used for measuring both of these conditions, a different calibration of the relay must be provided for each of the conditions.

The object of my invention, generally stated, is to provide, in a load measuring automatic reclosing circuit breaker system, for automatically calibrating the load measuring relay of the system in accordance with the existence or non-existence of potential on the circuit controlled by the breaker.

Another object of my invention is to provide for automatically controlling the calibration or setting of the load measuring relay of an automatic reclosing circuit breaker system controlling a feeder circuit to render the system effective to properly reconnect the feeder circuit to a power source, from which it has been disconnected under fault conditions, regardless of whether or not the feeder circuit is being supplied from a single power source or a plurality of power sources.

A more specific object of my invention is to provide a calibrating control system for an automatic reclosing circuit breaker system for a feeder circuit which shall automatically function to recalibrate or change the setting of the load measuring relay of the system depending upon whether the feeder circuit is being supplied from one source of power or from a plurality of sources of power.

A further object is to provide a control system for a load measuring relay of a circuit breaker system which shall be simple and efficient in operation, and which shall be inexpensive to manufacture, install, and maintain.

These and other objects and advantages of the invention will be apparent from the following detailed description taken in connection with the accompanying drawings in which.

In practicing my invention, a relay 10 is connected to selectively control the calibration of a load measuring relay 12 in accordance with the existence or non-existence of potential between the conductors P and N of a feeder or load circuit controlled by a circuit breaker 14. The load measuring relay 12 functions in cooperation with control relays 16 and 18 to energize the circuit breaker 14 when the effective load resistance between the conductors P and N is sufficiently high to permit the load circuit to be connected to a power supply circuit, represented by conductors B and N, when no other power source is connected to the conductors P and N, or when the potential, as determined by the resistance of the load circuit, on the conductors P and N is sufficiently high to safely permit connection of the power source conductors B and N thereto when there is another source of power supply connected to the conductors P and N.

Figure 1:
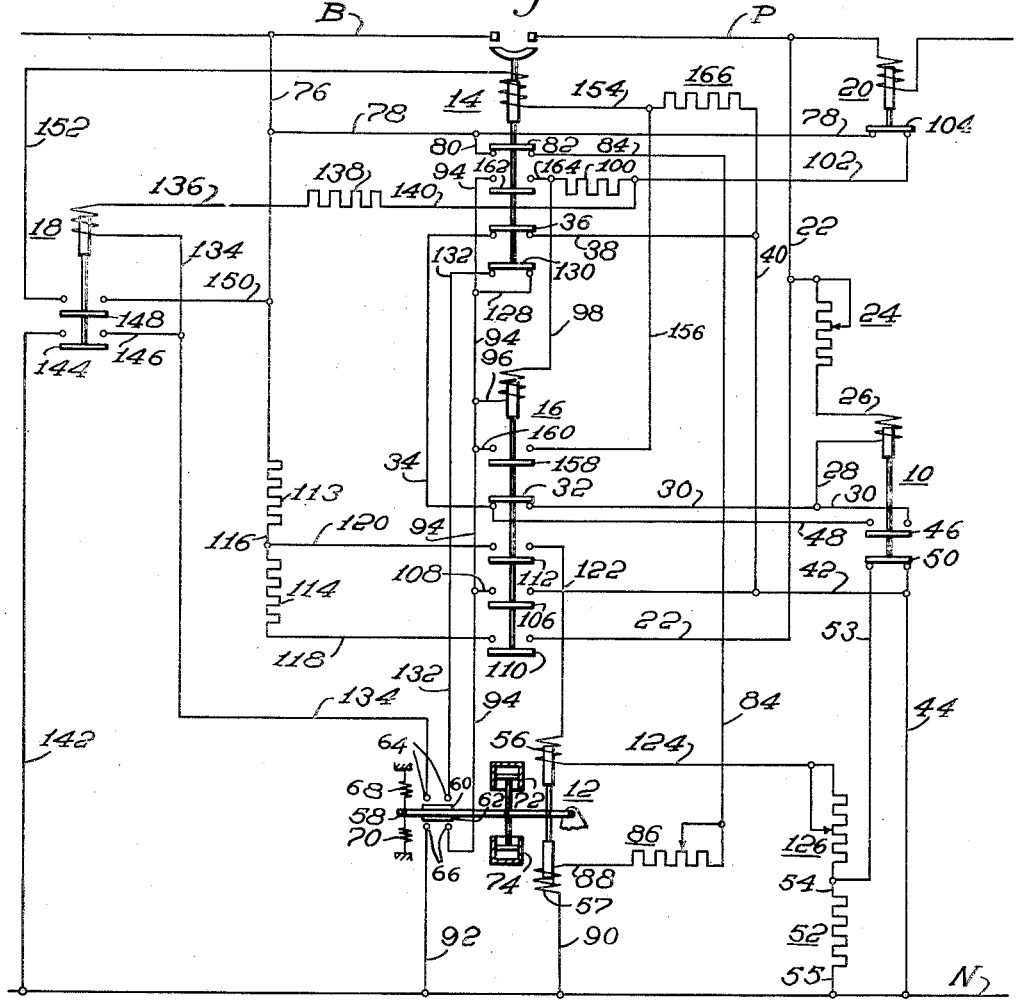
Figure 1 is a diagrammatic view of a circuit breaker system embodying the principal features of my invention.
Figure 3:
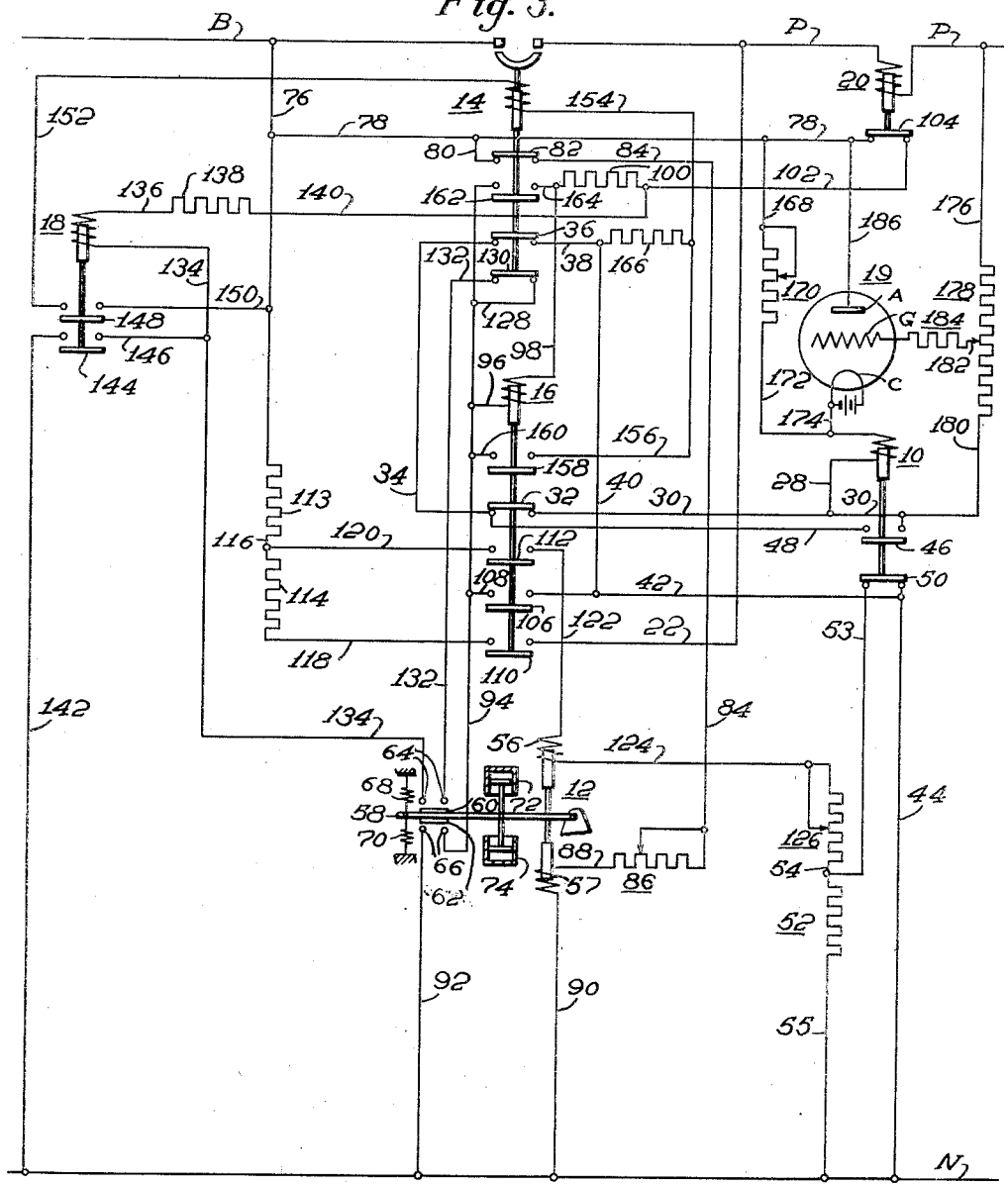
Fig. 3 is a diagrammatic view of a circuit breaker system embodying a modified form of the invention.

The embodiment of the invention shown in Fig. 3 functions in much the same manner as that shown in Fig. 1, an electric discharge device 19 being provided in the system of Fig. 3 to increase the sensitivity of the relay 10. Accordingly like reference characters are used to designate corresponding parts of the two systems.

Considering the system of Fig. 1 more in detail, an overload relay 20 is provided for causing the circuit breaker 14 to open when an overload occurs on the load or feeder circuit P and N in a manner which will be described more in detail hereinafter. With the circuit breaker 14 in the open position, as indicated in the drawing, the calibrating relay 10 will be connected across the power circuit conductors P and N in a circuit which extends from the conductor P through conductor 22, a rheostat 24, conductor 26, the winding of relay 10, conductors 28 and 30, back contact element 32 of control relay 16, conductor 34, back contact element 36 of the circuit breaker 14, and conductors 38, 40, 42, and 44 to conductor N.

The relay 10 may be a very sensitive relay which will be actuated by a very small potential applied thereto and the rheostat 24 is provided for adjusting the potential to which the relay 10 will respond. When the relay 10 is actuated, its contact members 46 will close a holding circuit for the relay which extends from the conductor P through the conductor 22, rheostat 24, conductor 26, the winding of relay 10, conductors 28 and 30, contact element 46 of the relay 10, and conductors 48 and 34, contact element 36, and conductors 38, 40, 42, and 44 to conductor N. The actuation of relay 10 will open its back contact element 50 to interrupt a shunting circuit for a calibrating resistor 52, which shunting circuit extends from the conductor N through the conductor 44, contact element 50, conductors 53 and 54, resistor 52, and conductor 55 to the conductor N. Thus the resistor 52 will have a shunting circuit applied thereto if no potential exists between the conductors P and N, such as would be applied to these conductors by another source of power (not shown) connected thereto, and will have the shunting circuit opened in the event that this other source of power is applying a potential to the conductors P and N.

The load measuring relay 12 comprises opposing relay windings 56 and 57 connected to a pivoted arm 58 upon which are mounted contact elements 60 and 62, which cooperate with fixed contact elements 64 and 66 when the arm 58 is actuated in opposite directions by the relay windings 56 and 57. The arm 58 is spring biased in both directions of movement by suitable spring or other biasing elements 68 and 70 which normally hold the arm in an intermediate position between the contact elements 64 and 66. Suitable time delay elements such as dashpots 72 and 74 are provided for producing a time delay in the movement of the arm 58 in either direction.

With the circuit breaker 14 in open circuit position as shown in the drawing, an energizing circuit is established for the winding 57 of the load measuring relay 12 which extends from the conductor B through the conductors 76, 78, and 80, back contact element 82 of the circuit breaker 14, conductor 84, rheostat 86, conductor 88, the winding 57, and conductor 90 to the conductor N. When the winding 57 of the relay 12 is thus energized, after a predetermined time delay determined by the dashpots 72 and 74, the contact element 62 will be actuated into engagement with the contact element 66 to close an energizing circuit for the winding of the control relay 16. This circuit extends from the conductor N through the conductor 92, the contact element 62, conductors 94 and 96, the winding of relay 16, conductors 98 and 104, a resistor 100, conductor 102, contact element 104 of the overload relay 20 and conductors 78 and 76 to the conductor B. The energization of the control relay 16 will cause it to close a holding circuit for its winding which extends from the conductor N through a conductors 44 and 42, contact element 106 of relay 16, conductors 108, 94, and 96, the winding of relay 16, conductors 98 and 104, resistor 100, conductor 102, contact element 104, and conductors 78 and 76 to conductor B. The relay 16 will thus be held in closed position.

The closure of control relay 16 establishes a load measuring circuit through its contact elements 110 and 112. Contact element 110 closes a circuit between the conductors B and P which extends from conductor B through conductor 76, a resistor 113, conductor 116, a resistor 114, conductor 118, contact element 110, and conductor 22 to the conductor P. The contact element 112 closes an energizing circuit for the winding 56 of the load measuring relay 12 which extends from the conductor B through conductor 76, resistor 113, conductors 116 and 120, contact element 112, conductor 122, the winding 56, conductor 124, rheostat 126, conductor 54, resistor 52, and conductor 55 to conductor N.

Figure 2:
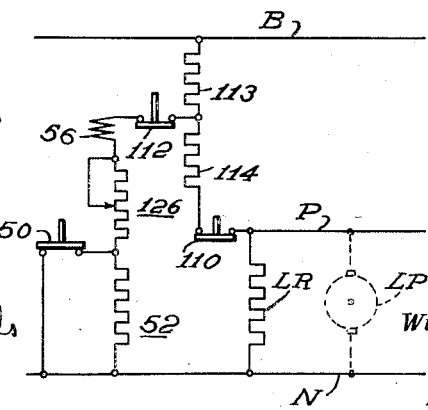
Fig. 2 is a simplified diagram of a part of the circuits of Figs. 1 and 3.

The load measuring circuit thus established by the contact elements 110 and 112 is shown in more simplified form in Fig. 2. Referring to Fig. 2, it will be seen that the resistor 113 is connected in series with two branch circuits, one extending through contact element 112 of control relay 16, the winding 56 of the load measuring relay 12, the rheostat 126, and either the resistor 52, or its shunting circuit controlled by the contact element 50 of relay 10, and the other extending through the resistor 114, contact element 110 of control relay 16, and the load impedance indicated by the reference characters LR, or in series with the load potential applied to the conductors P and N by any other source of power designated as LP. It will be seen that if the effective load resistance in one of the branch circuits is very low, such as when a short circuit exists across the conductors P and N, there will be insufficient current flow through the branch circuit containing the winding 56 of the relay 12 to permit the pull caused by the relay winding 56 to overcome the pull caused by the relay winding 57 which is already energized as hereinbefore described. If, however, the load resistance in the one branch circuit is sufficiently high to permit connection of the load conductors P and N to the power conductors B and N, sufficient current will flow through the branch circuit containing the winding 56 to cause the winding 56 to actuate the arm 58 to move the contact element 60 to closed circuit position.

In a similar manner, if there is another source of power LR, as shown in Fig. 2, connected to the conductors P and N, and which is not disconnected therefrom by the opening of the breaker 14, the relay winding 56 will not be sufficiently energized to actuate the arm 58 unless the potential applied to the power conductors P and N by the other power source LP is sufficiently high to safely connect the power conductors B and N to the load conductors P and N. When there is an additional source of power LP connected to conductors P and N, it is necessary that the winding 56 have a larger resistance in its circuit so that it will respond to the desired potential. As has been described hereinbefore, the resistor 52 will be connected in series with the winding 56 by the movement of the contact element 50 to open circuit position by the relay 10 which is responsive to any potential between the conductors P and N.

When load measuring relay 12 has thus moved the contact element 60 to engagement with the contact elements 64, an energizing circuit will be established for the control relay 18 which extends from the conductor N through the conductors 44 and 42, contact element 106, conductors 108, 94, and 128, back contact element 130 of circuit breaker 14, conductor 132, contact element 60, conductor 134, the winding of control relay 18, conductor 136, resistor 138, conductors 140 and 102, contact element 104, and conductors 78 and 76 to the conductor B. The actuation of the relay 18 will cause it to close a holding circuit for its winding which extends from the conductor N through the conductor 142, contact element 144 of control relay 18, conductors 146 and 134, the winding of control relay 18, conductor 136, resistor 133, conductors 140 and 102, contact element 104, and conductors 78 and 76 to conductor B. The actuation of control relay 18 will move its contact element 148 to closed circuit position to close an energizing circuit for the winding of the circuit breaker 14 which extends from conductor B through conductors 76 and 150, contact element 148, conductor 152, the winding of circuit breaker 14, conductors 154 and 156, contact element 158 of control relay 16, conductors 160, 94, and 108, contact element 106, and conductors 42 and 44 to conductor N.

The energization of the winding of the circuit breaker 14 will actuate the circuit breaker to closed position thereby closing its contact element 162 to establish a shunting circuit for the winding of the control relay 18 to thus deenergize its winding and open its contact element 106 to interrupt the holding circuit of the winding of the relay 16. The opening of the contact element 158 of the control relay 16 will cause the operating winding of the circuit breaker 14 to be connected in a holding circuit through a resistor 166 which extends from the conductor B through the conductors 76 and 150, contact element 148, conductor 152, the winding of circuit breaker 14, conductor 154, resistor 166, and conductors 40, 42 and 44 to the conductor N. The circuit breaker 14 will thus be held in closed circuit position as long as the control relay 18 is energized.

The closure of the circuit breaker 14 will break the hereinbefore described holding circuit for the relay 10 by the movement of the contact element 36 of the circuit breaker 14 to open circuit position. Likewise the deenergization of the control relay 16 will disconnect the load measuring relay 12 and its associated load measuring resistors 113 and 114.

If now an overload occurs upon the conductors P and N, the overload relay 20 will be actuated to open its contact element 104, thus opening the holding circuit for the control relay 18 to deenergize the relay 18 and cause its contact element 148 to move to open circuit position to open the holding circuit for the winding of the circuit breaker 14 and allow the circuit breaker to open. When the circuit breaker 14 has opened, the system will operate as hereinbefore described which is generally as follows: The relay 10 will control the calibration of the load measuring relay 12 by connecting the resistor 52 in circuit with the winding 56 if a source of power is supplying potential to the conductors P and N, but will allow the resistor 52 to remain shunted in the event that no power is being supplied to the conductors P and N, and it is desired that the load measuring relay 12 respond to the effective load resistance on the conductors P and N. After the time delay introduced by the dashpots 72 and 74 of the load measuring relay 12, the relay 12 will operate to close the circuit breaker 14 in the event that the potential applied to the conductors P and N is above a predetermined amount or in the event that the effective resistance of the load on the conductors P and N is above a predetermined amount.

The embodiment of the invention shown in Fig. 3 is generally similar to that of Fig. 1 with the exception that means are provided for rendering the potential relay 10 sensitive to much lower potentials on the conductors P and N. The corresponding parts of the circuits of Figs. 1 and 3 are designated by the same reference characters. Referring to Fig. 3, a circuit is provided for the coil of the relay 10 which extends from the conductor B through the conductors 76, 78, and 168, a rheostat 170, conductor 172, the winding of relay 10, conductors 28 and 30, contact element 32, conductor 34, contact element 36, conductors 38, 40, 42, and 44, to conductor N. The rheostat 170 introduced into the circuit of relay 10 may be adjusted so that the current flow through the winding of the relay 10 will be insufficient to actuate the relay. A connection is made by means of conductor 174 from conductor 172 to the cathode C of an electric discharge device 19 such, for example, as a thyratron, grid-glow tube or any other suitable device of this general nature which has the property of remaining conductive after it has been rendered conductive by grid control. A circuit is provided from the conductor P through a conductor 176, a rheostat 178, conductors 180 and 30, contact element 32, conductor 34, contact element 36, and conductors 38, 40, 42 and 44 of conductor N, so that any potential existing between the conductors P and N will be applied to the rheostat 178. A tap 182 of the rheostat 178 is connected to the grid G of the discharge device 19 through a resistor 184. The anode A of the discharge device 19 is connected to the conductor B by means of the conductors 76, 78 and 186. A suitable source of power such as a battery is provided for heating the cathode C. The drop in potential across the winding of the relay 10 due to current flow in its winding, as hereinbefore described, will subject the grid G of the discharge device 19 to a negative potential which will prevent it from conducting current. If, however, a potential is applied to conductors P and N, this negative bias on the grid G will be decreased to render the tube 19 conductive to energize the relay 10 through a circuit which extends from the conductor B through the conductors 76, 78, and 186, the anode A and the cathode C of the discharge 19, conductors 174 and 172, the winding of the relay 10, conductors 28 and 30, contact element 32, conductor 34, contact element 36, and conductors 38, 40, 42, and 44 to the conductor N. This energization of the relay 10 will cause the relay to make the resistor effective in series with the winding 56 of the load measuring relay 12, and the system will function as hereinbefore described in connection with the embodiment of Fig. 1 to measure potential on the load circuit conductors P and N and actuate the circuit breaker 14 to closed circuit position when the load circuit potential is sufficiently high to safely permit connection of the load circuit to the source of power represented by the conductors B and N. The discharge device 19 will be rendered non-conductive again when the circuit of relay 10 is opened by the opening of the back contact 30 of the circuit breaker 14 as hereinbefore described in connection with the system shown in Fig. 1.

Thus, it will be seen that I have provided a control system for a load measuring automatic reclosing circuit breaker system which shall function to automatically calibrate the load measuring relay of the breaker system in accordance with the existence or non-existence of potential on the circuit controlled by the breaker, which shall be sensitive, simple, and efficient in operation and which shall be inexpensive to manufacture, install, and maintain.

In compliance with the requirements of the patent statutes, I have shown and described herein the preferred embodiments of my invention. It is to be understood, however, that the

I claim as my invention:

1. In a control system for a circuit breaker which is disposed to connect a load circuit to a power source, a load measuring device for measuring the characteristics of the load circuit, means whereby said load measuring device controls the energization of the circuit breaker, and means responsive to the existence of potential on the load circuit for controlling the calibration of said load measuring device in accordance with the existence or non-existence of potential on the circuit.

2. In a circuit breaker control system, a circuit breaker disposed to connect a load circuit to a source of power when tthe circuit breaker is actuated, load measuring relay means for controlling the actuation of said breaker, means responsive to the opening of said circuit breaker for energizing said load measuring relay, and relay means responsive to the existence of potential on the load circuit for controlling the calibration of said load measuring relay in accordance with the existence or non-existence of potential on the load circuit.

3. In a circuit breaker control system, a circuit breaker disposed to connect a load circuit to a source of power when the circuit breaker is energized, load measuring means for testing the characteristics of the load circuit to determine its suitability for connection to the power source by the circuit breaker, means whereby said load measuring means controls the energization of said circuit breaker, and relay means responsive to the existence of potential on the load circuit for controlling the calibration of said load measuring means in accordance with the existence or non-existence of potential on the load circuit.

4. In a circuit breaker control system, a circuit breaker disposed to connect a load circuit to a source of power, load measuring means for testing the characteristics of the load circuit to determine the suitability of the load circuit for connection to the power source by the circuit breaker, means whereby said load measuring means controls the actuation of said circuit breaker, relay means responsive to the existence of potential on the load circuit for controlling the calibration of said load measuring means in accordance with the existence or non-existence of potential on the load circuit, and means whereby said load measuring means and said calibration control means is controlled by the said circuit breaker.

5. In a circuit breaker control system, a circuit breaker disposed to connect a load circuit to a source of power when the circuit breaker is energized, load measuring means for testing the characteristics of the load circuit for connection to the power source by the circuit breaker, means whereby said load measuring means controls the energization of said circuit breaker, and relay means responsive to the existence of potential on the load circuit for controlling the calibration of said load measuring means, said last named relay means comprising an electric discharge device connected to be rendered conductive by potential on the load circuit.

6. In a control system for a load measuring relay means which functions to measure either the potential on a load circuit or the effective impedance of the load circuit depending upon whether or not there is potential on the load circuit, potential relay means responsive to potential on the load circuit, and means whereby said potential relay means controls the calibration of the load measuring relay in accordance with whether or not potential exists on the load circuit.

7. In a control system for a load measuring relay means which functions to measure either the potential on a load circuit or the effective impedance of the load circuit depending upon whether or not there is potential on the load circuit, relay means responsive to potential on the load circuit, and means whereby said potention relay means controls the calibration of the load measuring relay in accordance with whether or not potential exists on the load circuit, said potential relay means comprising an electric discharge device and means whereby the existence of potential on the load circuit renders the discharge device conductive.

8. In a control system for a load measuring relay means which functions to measure either the potential on a load circuit or the effective impedance of the load circuit depending upon whether or not there is a potential on the load circuit, potential relay means responsive to potential on the load circuit, a calibrating resistor in circuit with the load measuring relay means, and means whereby said potential relay means controls the effective resistance of said calibrating resistor in accordance with whether or not potential exists on the load circuit.

9. In a control system for a load measuring relay means which functions to measure either the potential on a load circuit or the effective impedance of the load circuit depending upon whether or not there is a potential on the load circuit, potential relay means responsive to potential on the load circuit, a calibrating resistor in circuit with the load measuring relay means, and means whereby said potential relay means controls the effective resistance of said calibrating resistor in accordance with whether or not potential exists on the load circuit, said potential relay means comprising an electric discharge device, a relay connected in circuit therewith, and means connecting the discharge device to be rendered conductive by potential on the load circuit.

10. In a control system, a circuit breaker disposed to connect a load circuit to a source of power, load measuring relay means for measuring either the potential on the load circuit or the effective impedance of the load circuit depending upon whether or not there is potential on the load circuit to thus determine the suitability of the load circuit for connection to the power source by said circuit breaker, means whereby said load measuring relay means controls the actuation of said circuit breaker, potential relay means responsive to potential on the load circuit, and means whereby said potential relay means controls the calibration of the load measuring relay means in accordance with whether or not potential exists on the load circuit.

11. In a control system, a circuit breaker disposed to connect a load circuit to a source of power, load measuring relay means for measuring either the potential on the load circuit or the effective impedance of the load circuit depending upon whether or not there is potential on the load circuit to thus determine the suitability of the load circuit for connection to the power source by said circuit breaker, means whereby said load measuring relay means controls the actuation of said circuit breaker, an electric discharge device connected to be rendered conductive by potential on the load circuit, a calibrating relay connected in circuit with said discharge device to be energized when said discharge device is rendered conductive, and means whereby said calibrating relay controls the calibration of said load measuring relay means in accordance with whether or not potential exists on the load circuit.

12. In a control system, a circuit breaker disposed to connect a load circuit to a source of power, load measuring relay means for measuring either the potential on the load circuit or the effective impedance of the load circuit depending upon whether or not there is potential on the load circuit to thus determine the suitability of the load circuit for connection to the power source by said circuit breaker, means whereby said load measuring relay means controls the actuation of said circuit breaker, potential relay means responsive to potential on the load circuit, means whereby said potential relay means controls the calibration of the load measuring relay means in accordance with whether or not potential exists on the load circuit, means responsive to the opening of the circuit breaker for connecting said load measuring relay means and said potential relay means for operation, and means responsive to the closure of the circuit breaker for rendering said load measuring relay means and said potential relay means inoperative.

13. In a control system, a circuit breaker disposed to connect a load circuit to a source of power, load measuring relay means for measuring either the potential on the load circuit or the effective impedance of the load circuit depending upon whether or not there is potential on the load circuit to thus determine the suitability of the load circuit for connection to the power source by said circuit breaker, means whereby said load measuring relay means controls the actuation of said circuit breaker, an electric discharge device connected to be rendered conductive by potential on the load circuit, a calibrating relay connected in circuit with said discharge device to be energized when said discharge device is rendered conductive, means whereby said calibrating relay controls the calibration of said load measuring relay means in accordance with whether or not potential exists on the load circuit, means responsive to the opening of the circuit breaker for rendering said load measuring means, said discharge device, and said calibrating relay operative, and means responsive to the closure of said circuit breaker for rendering said load measuring means, said discharge device, and said calibrating relay inoperative.

14. In combination with a load measuring device for a circuit breaker control system which functions to control a circuit breaker which is disposed to connect a load circuit with a power source, means for connecting said load measuring device with the power source, relay means responsive to the existence of potential on the load circuit, and means whereby said relay controls the calibration of said load measuring device in accordance with the existence or nonexistence of potential on the load circuit.

15. In combination with a load measuring device for a circuit breaker control system which functions to control a circuit breaker which is disposed to connect a load circuit with a power source, means for connecting the said load measuring device with the power source, relay means responsive to the existence of potential on the load circuit, and means whereby the actuation of said relay varies the calibration of said load measuring device.

WILLIAM R. TALIAFERRO.